United States Patent [19]

Stewart

[11] Patent Number: 5,111,312
[45] Date of Patent: May 5, 1992

[54] COUPLING MECHANISM FOR EFFICIENT CONVERSION OF AXISYMMETRIC BEAM PROFILES INTO PROFILES SUITABLE FOR DIFFRACTION-FREE TRANSMISSION IN FREE SPACE

[76] Inventor: Bob W. Stewart, 5745 Pandora Ave., Cincinnati, Ohio 45213

[21] Appl. No.: 654,216

[22] Filed: Feb. 12, 1991

Related U.S. Application Data

[63] Continuation-in-part of Ser. No. 380,890, Jul. 18, 1989, Pat. No. 4,992,750.

[51] Int. Cl.[5] .................. G03H 1/04; G03H 1/12
[52] U.S. Cl. ............................... 359/11; 359/30; 359/562
[58] Field of Search ............ 350/3.68, 3.83, 162.11, 350/3.7, 3.72, 162.12

[56] References Cited

U.S. PATENT DOCUMENTS

| | | | |
|---|---|---|---|
| 3,704,930 | 12/1972 | McMahon | 350/3.83 |
| 3,880,497 | 4/1975 | Bryngdahl | 350/162.12 |
| 4,050,036 | 9/1977 | Chambers et al. | |
| 4,145,671 | 3/1979 | Hellwarth | |
| 4,283,109 | 8/1981 | Huff et al. | 350/3.83 |
| 4,794,344 | 12/1988 | Johnson | |
| 4,803,686 | 2/1989 | Brock | |
| 4,835,088 | 5/1989 | Gilson | 350/162.11 |
| 4,852,973 | 8/1989 | Durnin et al. | |
| 4,865,042 | 9/1989 | Umemura et al. | |
| 4,879,532 | 11/1989 | Shemwell et al. | |
| 4,887,885 | 12/1989 | Durnin et al. | |
| 4,992,750 | 2/1991 | Stewart | |

OTHER PUBLICATIONS

Durnin, J., Micheli, J. J., Jr., Eberly, J. J., Physics Review Letters, "Diffraction-Free Beams", vol. 58, No. 15, 1499–1501, Apr. 13, 1987.

Tschudi, I., Herden, A., Goltz, J., Klumb, H., Laeri, F., Albers, J., "Image Amplification by Two-and Four-Wave Mixing in $BaTiO_3$ Photorefractive Crystals", Journal of Quantum Electronics, vol. QE 22, No. 8, Aug. 1986.

Hailin, H., "Formation and Applications of Ring Profile Laser Beams", Chinese Physics–Lasers, vol. 13, No. 10, Oct. 1986.

Husu, H., "Large-Signal Theory of Phase-Conjugate Back-Scatterings", Applied Physics Letters, vol. 34 (12), Jun. 15, 1979.

Principles of Phase Conjugation, Springer-Verlag, 1985, pp. 4–7, 144–145, and 238–239.

Primary Examiner—Bruce Y. Arnold
Assistant Examiner—Martin Lerner
Attorney, Agent, or Firm—Wood, Herron & Evans

[57] ABSTRACT

Novel designs for efficient coupling mechanism for the conversion of typical profile laser beams into $J_o$-profile beams are presented. Several specific embodiments are provided which employ non-linear optical mechanisms in the conversion process, and other embodiments are provided which utilize holography in the conversion process.

7 Claims, 7 Drawing Sheets

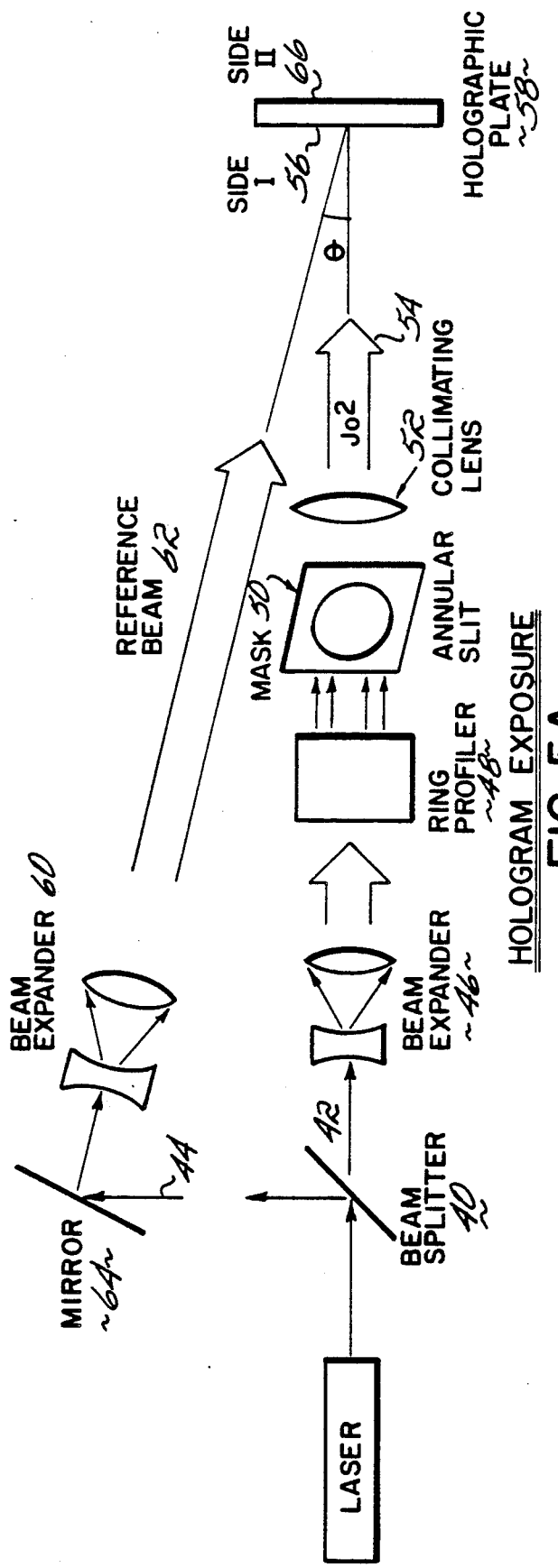
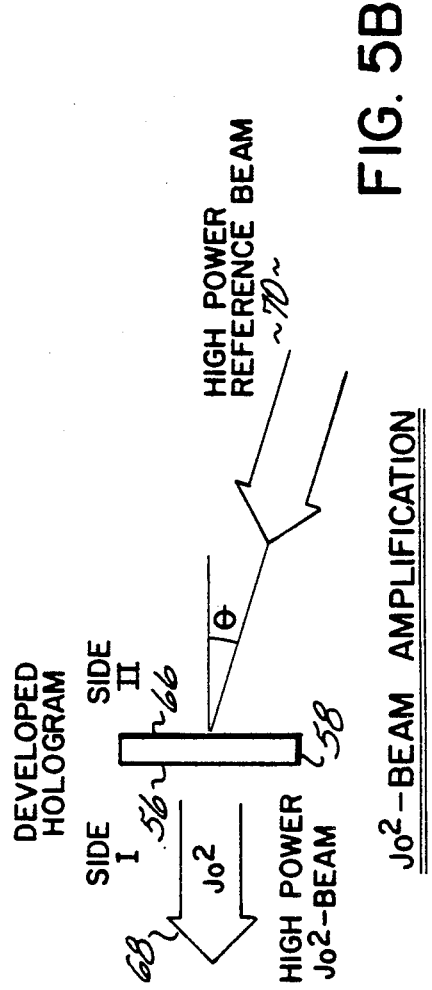

HOLOGRAM EXPOSURE

$J_0$ — BEAM AMPLIFICATION

COUPLING MECHANISM FOR EFFICIENT CONVERSION OF AXISYMMETRIC BEAM PROFILES INTO PROFILES SUITABLE FOR DIFFRACTION-FREE TRANSMISSION IN FREE SPACE

This application is a continuation-in-part of application Ser. No. 07/380,890, filed Jul. 18, 1989, now U.S. Pat. No. 4,992,750, issued Feb. 12, 1991.

BACKGROUND OF THE INVENTION

Durnin, Miceli, and Eberly of the University of Rochester have demonstrated, both theoretically and experimentally, the existence of diffraction-free modes in free space laser beam propagation. See Durnin, J., Miceli, J. J., Jr., and Eberly, J. H., Phys. Rev. Lett. 58, 1499–1501 (1987). By passing an ordinary, Gaussian profile laser beam through a thin annular slit and collimating the result, the workers generated a beam with a $J_o$-type profile. (" $J_o$ " refers to the Bessel function of zeroth order.) The advantage of the $J_o$-profile over the Gaussian profile is that the former does not suffer geometric divergence (herein referred to as diffraction) as it propagates in free space, with no boundaries nor guiding surfaces present. Of course, plane waves also share this property. However, the $J_o$-profile has the advantage that the beam's intensity is the greatest at the center, an important feature for laser welding, laser neutral-particle beam guidance.

Unfortunately, in the process of "reforming" the beam's profile, much of the energy is lost in absorption by the mask containing the annular slit itself. This reality severely limits the usefulness of the technique for high power applications. Additionally, although the beam does not undergo diffractive spreading, the radius of the collimating lens determines an effective maximum range. However, this range was shown by Durnin, Miceli and Eberly to usually be much greater than that of the ordinary, collimated Gaussian beam. These researchers also experimentally demonstrated that the $J_o$-profiled beam had a greatly increased propagation range as compared to the associated Gaussian-profiled beam.

The practical difficulty with employment of this Gaussian-to-$J_o$ coupling mechanism to problems, for instance, related to high energy, long distance laser beam transmission lies in the fact that about 99% of the laser beam's energy is absorbed by the mask; only a fraction is transmitted through the annular slit.

Some of the system(s) detailed below incorporate nonlinear optical mechanisms, including stimulated Brillouin scattering (SBS), two-wave mixing (twm) and degenerate four-wave mixing. Both SBS and twm are described in some detail in Zel'dovich, B.Ya., Pilipetsky, N. F., and Shkunov, V. V., *Principles of Phase Conjugation*, Springer-Verlag, 1985. Degenerate four-wave mixing (dfwm) is described in U.S. Pat. No. 4,145,671 to Hellwarth as well as in the Zel'dovich et al. text. Both SBS and dfwm are often referred to as optical phase conjugation (opc) processes. Other systems described herein make use of holograms (rather than nonlinear media) in the Gaussian-to-Jo coupling.

SUMMARY OF THE INVENTION

The systems described herein allow much greater efficiency in the Gaussian-to-$J_o$ coupling process. In fact, any collimated beam with an axisymmetric intensity profile can efficiently be converted into a $J_o$ profile. The present invention, in its various embodiments, utilizes non-linear optical processes or holography in order to achieve its higher conversion efficiency. The present invention can have a variety of applications: precision laser alignment systems, precision laser welding systems, long-distance laser communication and power transmission systems, and charged and neutral-particle beam channeling or optical systems. The use of $J_o$-profiled beams provides advantages over Gaussian beams in extracting energy efficiently from laser gain media, while maintaining low beam divergence, due to the superior diffraction and volume "fill-in" characteristics of the $J_o$-profiled beam. It can find utility in any application in which any combination of high central intensity, rapid intensity decrease in the transverse direction, or long propagation distances are desired.

One design for the coupling mechanism is indicated in FIG. 1 (*a*) and (*b*). In the figure a single laser is used. A low intensity portion of the beam is diverted and used to illuminate the mask containing the annular slit. Only about 1% of this beam's intensity will be transmitted through the mask in the optimum geometry. This light is then directed into the four-wave mixing medium. The four-wave mixing medium is pumped by the same laser. The dfwm mechanism will phase conjugate and amplify the $J_o$ profile beam component. The result is a more efficient coupling of the laser's energy into the $J_o$ profile. Theoretical calculations indicate that 50% of the pump beam's laser energy can be coupled this way. See Hsu, H., Appl. Phys. Lett. 34, 855 (1979). Experimentally, gains as high as 1000 have been achieved. See Tschudi, T., Herden, A., Goltz, J., Klumb, H., Laeri, F., and Albers., J., IEEE J. Quant. Elect. QE-22 1493 (1986). A gain of 100 in the present case leads to a prediction of 33% coupling efficiency. Therefore, we expect between 33%–50% efficiency in the coupling mechanism depending upon the geometry employed. This, of course, represents a significant improvement over the 1% coupling one would expect without using the device. This improvement should make this $J_o$ coupling approach clearly preferable to the standard transmission of Gaussian profile laser beams in some instances.

Non-Gaussian profiles of collimated beams can be converted into $J_o$-profiles as well. In fact, by use of a "donut-mode" profile roughly twice as much energy can be coupled to the $J_o$ form. Also, since most lasers could be designed with higher outputs if the $TEM_{oo}$ restrictions were lifted, this approach could be multiply beneficial. As a further example, a device which converts a beam with a Gaussian profile (or any other axisymmetric profile) into a ring-profiled beam has been described in Hailin, H., Chin, J., Laser 13, 654 (1986), the text of which is incorporated herein by reference. This ring profiler could be employed to significantly increase the percentage of incident light transmitted through the annular slit.

In alternative embodiments of the present invention, holograms are produced and/or utilized to provide the desired amplified $J_o$-profiled beam output. These holograms have a diffraction grating formed therein either by exposure of a photosensitive layer or by computer controlled etching. The diffraction gratings embody interference patterns formed by the substantially complete overlap of a reference beam and a $J_o$-profiled beam (or a computer-generated simulation thereof). When a high power reference (or read-out) beam is then directed toward the hologram diffraction grating, an amplified $J_o$-profiled beam is produced. This $J_o$-profiled beam may or may not be the phase conjugate of the original $J_o$ beam, depending on whether dfwm or twm is used. Various holographic embodiments are contemplated which are analogous to the dfwm and twm schemes that utilize optically non-linear media.

BRIEF DESCRIPTION OF THE DRAWINGS

The following and other objects and features of the invention may be readily understood with reference to the following detailed description taken in conjunction with the accompanying drawings in which:

FIGS. 5A and B show an alternative embodiment of the present invention utilizing holography.

DETAILED DESCRIPTION OF THE INVENTION

Figure 3:
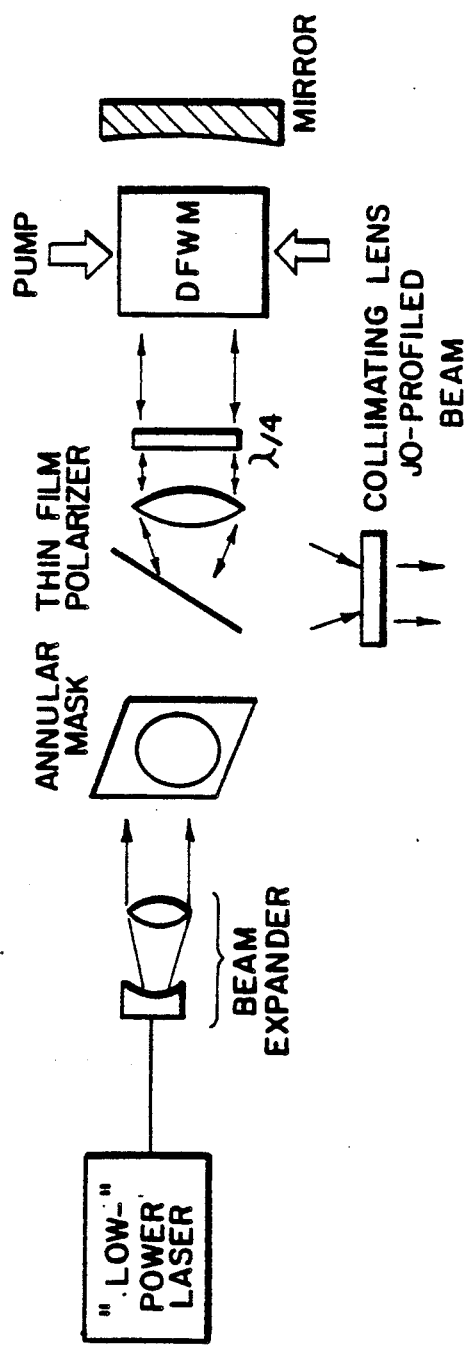
FIG. 3 shows a laser-laser resonant cavity embodiment in which only DFWM is employed.

The sequence of processes involved in one preferred embodiment occur as follows (refer to FIG. 3): the beam from a low power laser is expanded and directed onto the annular mask. Note a ring-profiler can be used here but is not indicated on the figure. The portion which passes through the mask is transmitted through a thin-film polarizer and is collimated by a Fourier-transforming lens. The collimated beam passes through a quarter wave plate and into the dfwm medium. The medium is the gain medium located in the resonant cavity of a high power laser. The result of the dfwm process is the amplified phase conjugate (pc) beam. The pc beam passes back through the quarter wave plate and the lens. It is reflected from the thin film polarizer. The pc beam is then collimated by another Fourier-transforming lens, producing the amplified, $J_o$-profiled beam.

Figure 1:
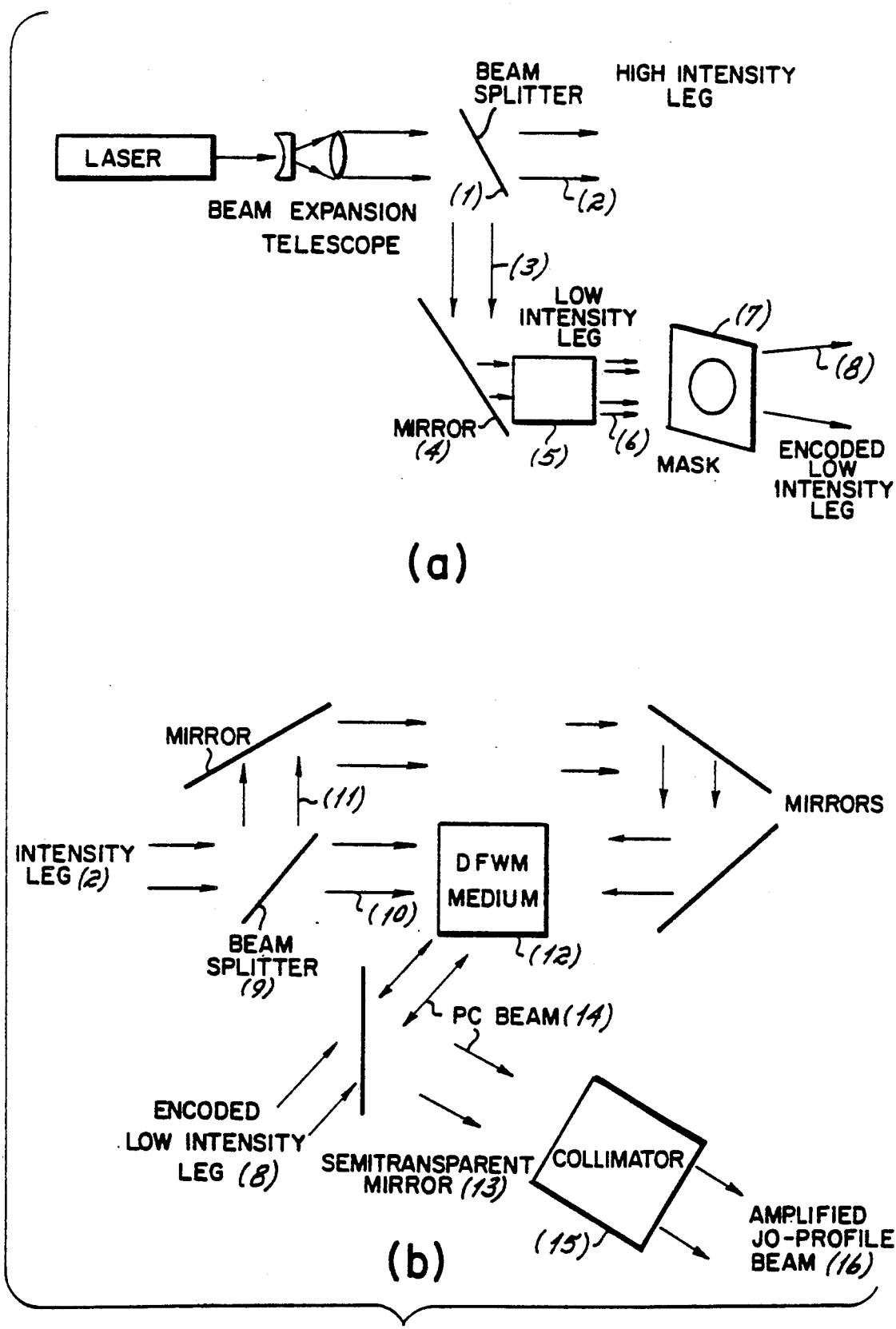
FIGS. 1A and 1B show the single laser-encoded probe embodiment of the invention. DFWM is employed.

The sequence of processes involved in a related embodiment occurs as follows: [refer to FIG. 1(a) and (b)] the beam from the laser is expanded and then split into two components by a beam splitter (1). Said beam splitter separates the beam into a high intensity segment (2) and a low-intensity segment (3). The low intensity segment (3) enters the ring profiler (5) and is incident upon the annular mask (7) resulting in a low-intensity encoded segment (8). The high intensity segment is split into two segments, (10) and (11), which serve as the pump beams for the dfwm process. The encoded low intensity segment (8) serves as the probe beam for this process yielding an encoded pc beam (14) of much higher intensity. This segment, (14), is then collimated producing the amplified $J_o$-profiled beam (16).

Figure 2:
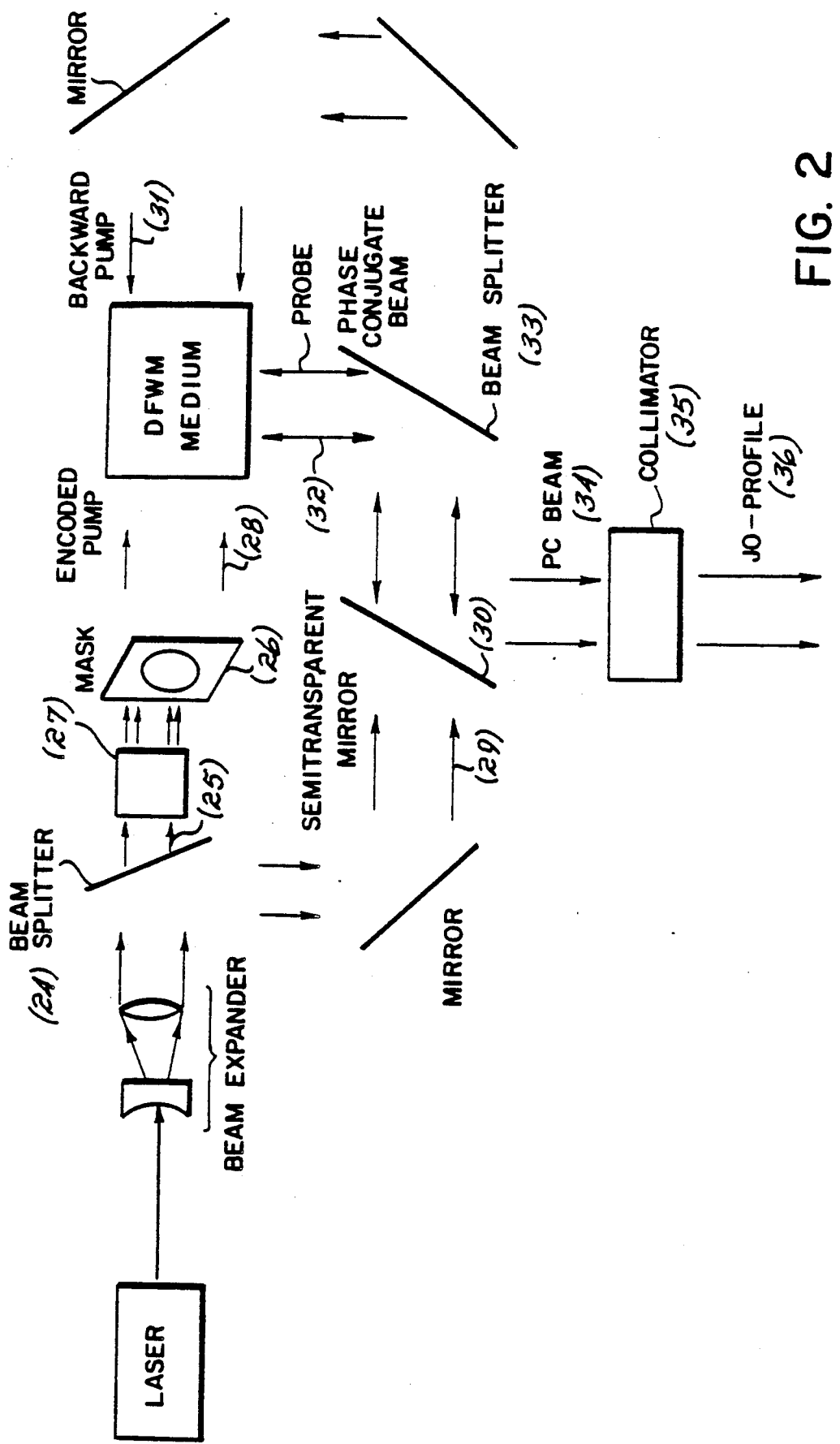
FIG. 2 shows the single laser-encoded pump embodiment of the invention. DFWM is employed.

Another alternative embodiment is depicted in FIG. 2. In the embodiment, the laser beam is first expanded and then split by beam splitter (24) into a low intensity segment (25) and a high intensity segment (29). The low intensity segment is sent into the ring profiler (27) and onto the annular mask (26). The result is a low intensity encoded segment (28). This serves as the forward pump in the dfwm process. The backward pump (31) and the probe (32) are obtained by splitting the high intensity segment (29) with beam splitter (33). In a similar fashion, the backward pump can be formed using the low-intensity encoded segment with the forward pump and probe formed from the high-intensity segment.

The dfwm process produces the amplified encoded pc beam (34) which is diverted by the semi-transparent mirror (30) into the collimator (35) producing the amplified $J_o$-profiled beam (36).

Figure 4:
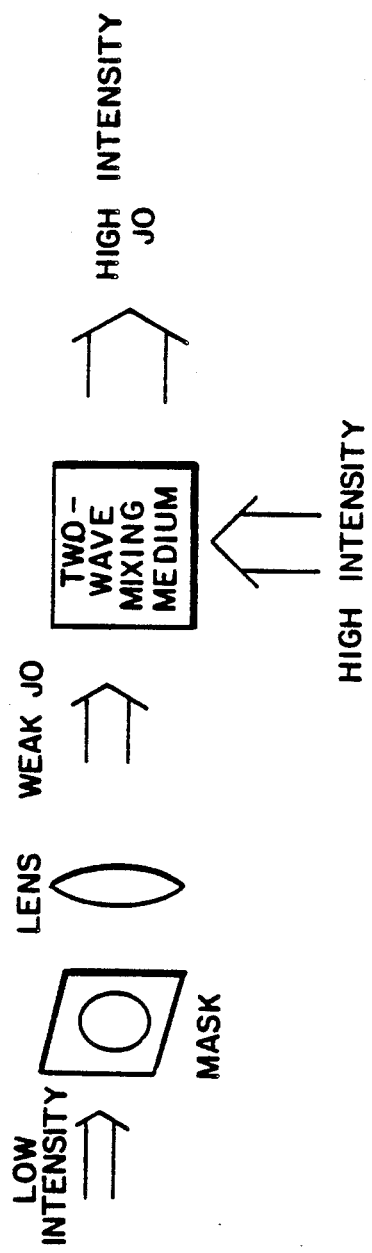
FIG. 4 shows the two laser embodiment in which twm is employed.

Finally, we mention a non-opc mechanism which will also allow an efficient coupling of laser energy into the $J_o$-profiled form. It involves two wave mixing (twm) in photorefractive media (see FIG. 4). In this approach the low intensity segment which is obtained as before by first expanding the laser beam and then using a beam splitter, is again sent into a ring profiler and then directed onto the annular mask. The result is collimated and directed into a photo-refractive medium. An example of such media for visible light is barium titanate, $BaTiO_3$. The high intensity segment is also directed into the medium. The result of the coupling is an amplified, $J_o$-profiled beam propagating parallel to the incident low intensity segment. It is not necessary to use one laser for this embodiment; one high power and one low power laser can be employed.

Holograms generated either photographically or by a computer can also be used as a pc medium. In general, holograms are generated photographically by recording the interference pattern of a reference beam and an object beam in the photosensitive layer of a holographic plate. In order to produce the desired interference pattern, the reference beam and object beam should substantially completely overlap at the location whereat they impinge on the photosensitive layer. It is generally preferred that the angle between the reference and object beams as they impinge on the photographic layer is between about 30°-40°. This results in optimum exposure of the holographic plate. Additionally, the object and reference beams preferably should be about equal in intensity.

Many holographic plates are commercially available and the specific plate chosen is not deemed to be critical in the practice of the present invention. Examples of suitable plates are those manufactured by Agfa and sold under the designations 8E56 and 8E75. The amount of exposure time required for the holographic plate is typically specified by the film manufacturer. Once exposed, the holographic plate must be developed to produce the diffraction grating. The procedures for this development are well known to persons of ordinary skill in the art. By way of example, however, the plate may be developed by immersion in JD-2 (sold by Integraf) for two minutes. The plate is then washed for three minutes with distilled water. Thereafter, the plate/film is bleached (using Integraf bleach) until it is clear, and then washed for another three minutes with distilled water. Finally, the film is air dried; this may be accomplished with a hand-held hair dryer.

Computer generated holograms, which may be utilized in the practice of the present invention, are produced in accordance with the following general procedures. Initially, the required hologram diffraction grating, i.e., that required to produce the desired resultant $J_o$-profiled beam from a given incident Gaussian-profiled beam, is calculated numerically via a computer using commercially available software. Second, a computer-controlled electron gun is utilized to etch 0.5 micron (width) lines into the holographic plate in accordance with the previously calculated pattern. The result is a phase-hologram which produces the desired $J_o$-profiled output beam when a particular Gaussian-profiled reference beam is incident on the plate.

With reference to FIGS. 5A and B, there is shown apparatus for effecting the conversion of a typical profile laser beam into a $J_o$-profiled beam which utilizes holography. In a first step, the apparatus shown in FIG. 5A is used to record the interference pattern between a $J_o$-profiled beam and a reference beam on a holographic plate. In the apparatus shown, the beam from the laser is split by beam splitter (40) into a higher intensity segment (42) which is directed along a first optical path and a lower intensity segment (44) directed along a second optical path. The higher intensity segment (42) is expanded by beam expander (46) and directed into ring profiler (48), thereby obtaining a ring profile. The ring-profiled segment is incident upon mask (50) (which has an annular slit), thereby resulting in a filtered, ring-profiled segment. This segment then passes through collimating lens (52) thereby producing a $J_o$-profiled beam (54) which is directed toward the first side (56) of holographic plate (58).

A beam expander (60) is disposed along the second optical path for expanding the lower intensity segment (44) thereby producing a reference beam (62). Also disposed along the second optical path is means such as a mirror (64) for directing the reference beam toward the first side (56) of the holographic plate (58). It will be appreciated that beam expander (60) may alternatively be positioned between beam splitter (40) and mirror (64) along the second optical path.

The apparatus components shown in FIG. 5A are arranged and designed so that the cross-sectional area of reference beam (62) and $J_o$-profiled beam (54) are substantially the same and substantially completely overlap at the location where each said beam impinges on the holographic plate. Additionally, the angle $\theta$ preferably falls within the optimum range for exposure of a holographic plate, that range being between about 30°–40°. By exposing the photosensitive layer in the holographic plate (58) for the necessary period of time, the interference pattern between the $J_o$-profiled beam (54) and the reference beam (62) is recorded.

In a subsequent step not shown, the holographic plate is developed in a manner such as that described hereinabove to produce a diffraction grating. In a final step, known as the "readout" step, the developed holographic plate containing the diffraction grating is used to produce the desired high power (amplified) $J_o$-profiled beam. As shown in FIG. 5B, this is accomplished by directing a new high power reference beam (70), which is preferably the entire high power output from the original laser (expanded to the desired cross-sectional area), toward the second side (66) of holographic plate (58). This high power reference beam (70) is counterpropagating with respect to the original reference beam (62), i.e., parallel to, but in the opposite direction of, reference beam (62). The incidence of reference beam (70) on the diffraction grating formed in the holographic plate produces a $J_o$-profiled output beam (68) which has the intensity of the high power reference beam (70) and is the phase conjugate of $J_o$-profiled beam (54).

Figure 6A:
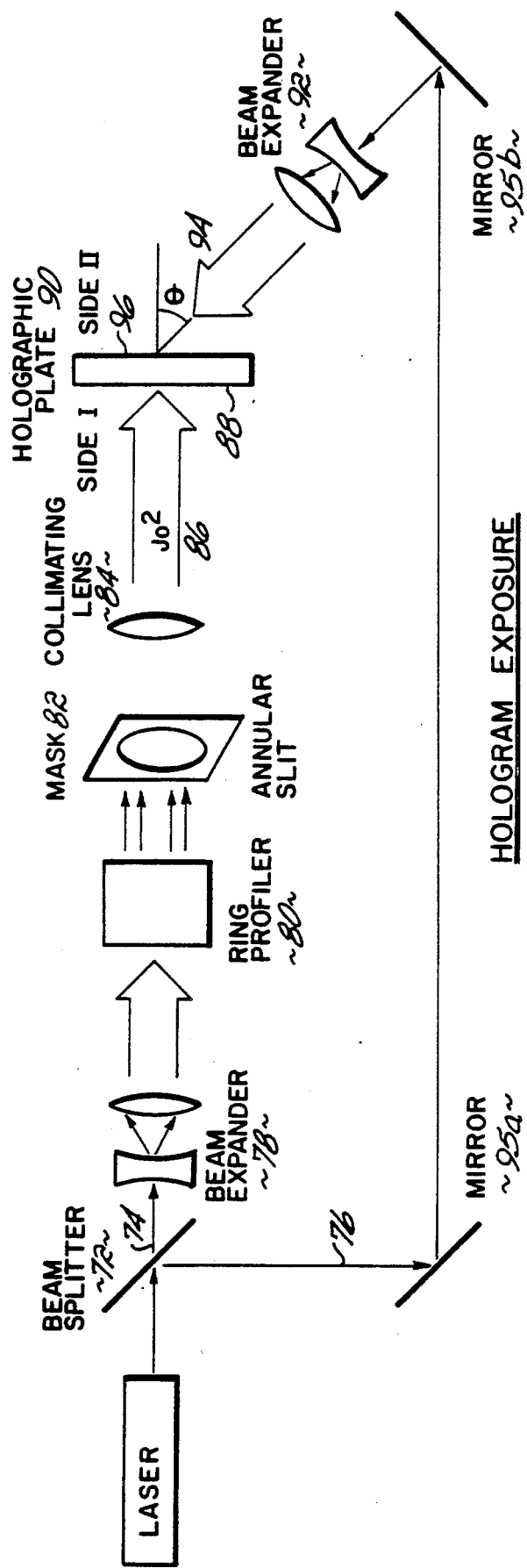
FIGS. 6A and B show, another alternative embodiment of the present invention utilizing holography.
Figure 6B:
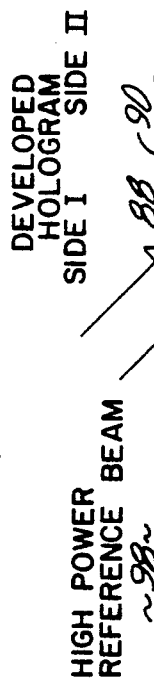

A related embodiment of the present invention utilizing a holographic plate is shown in FIGS. 6A and 6B. In this embodiment, the laser beam is split by beam splitter (72) into a higher intensity segment (74) and a lower intensity segment (76). The higher intensity segment (74), which is directed along a first optical path, passes through beam expander (78) and into ring profiler (80), thereby obtaining a ring profile. The ring-profiled segment then is directed onto mask (82) which contains an annular slit for filtering the ring-profiled segment. This filtered, ring-profiled segment is then collimated by collimating lens (84) to produce the $J_o$-profiled beam (86) which is directed toward the first side (88) of holographic plate (90) in a direction normal thereto. In this embodiment, the lower intensity segment (76) is directed along a second optical path and passes through beam expander (92) to produce a reference beam (94) directed toward the second side (96) of holographic plate (90). Means such as mirrors 95a and b are disposed along the second optical path for directing reference beam (94) toward the second side (96) of holographic plate (90). It should be appreciated that beam expander (92) can be disposed along the second optical path as shown, or between mirrors 95a and b, or between mirror 95a and beam splitter 72.

As in the previous holographic embodiment, the components shown in FIG. 6A are arranged and designed so that the cross-sectional area of reference beam (94) and $J_o$-profiled beam (86) are substantially the same. Reference beam (94) impinges on the photosensitive layer of holographic plate (90) at an angle $\theta$ to the normal direction. The $J_o$-profiled beam (86) is incident on the photosensitive layer of holographic plate (90) in a direction normal thereto. The reference beam (94) and $J_o$-profiled beam (86) should preferably substantially completely overlap at the location where each said beam impinges on the photosensitive layer. The result is an interference pattern which is recorded in the photosensitive layer.

In the next step (not shown), the holographic plate is developed using previously described procedures. Thereafter, a new high power reference beam (98), which is preferably the total power output from the laser, is directed toward the first side (88) of the holographic plate (90) in a direction 180° opposite that of the original reference beam (94); that is, counterpropagating with respect thereto. This results in the output, from the diffraction grating formed in the holographic plate, of a high power $J_o$-profiled beam (100) which has the intensity of the high power reference beam (94) and is the phase conjugate thereof.

Figure 7A:
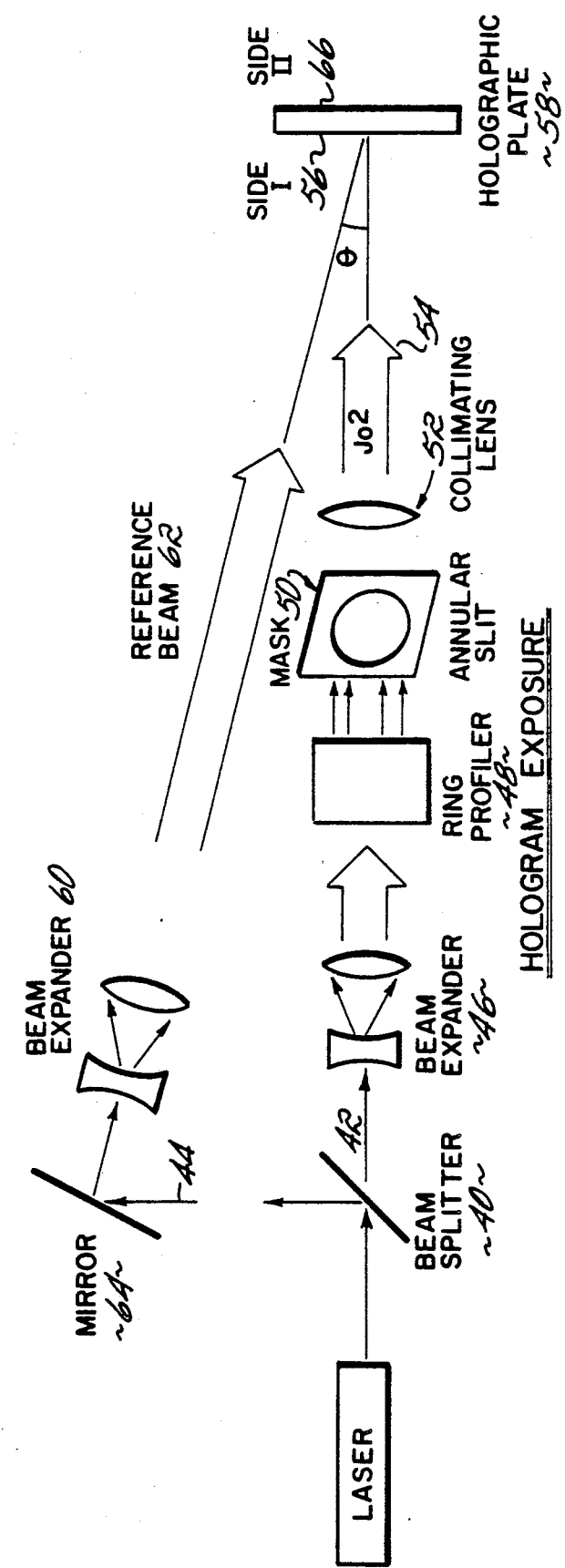
FIGS. 7A and B show another alternative embodiment of the present invention utilizing holography.
Figure 7B:
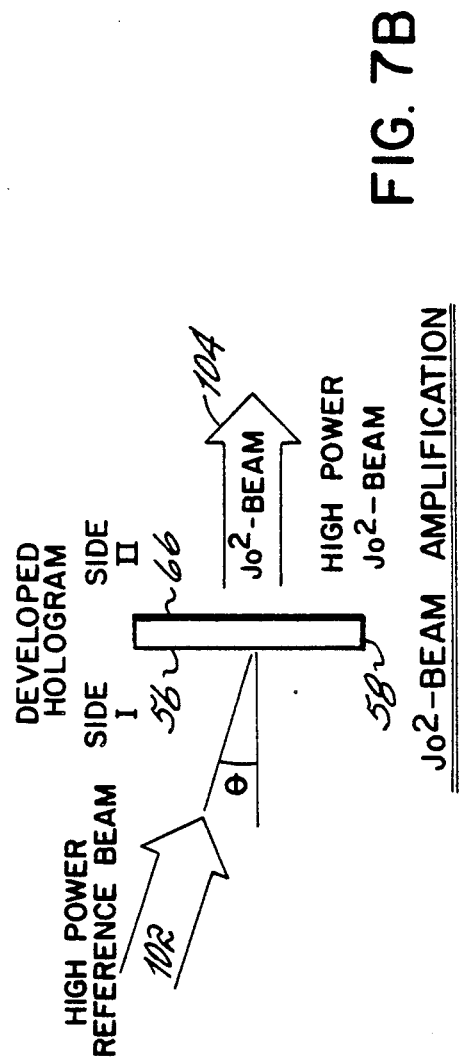

Another alternative embodiment, which utilizes two-wave mixing (twm), is shown in FIGS. 7A and 7B. In this embodiment, the apparatus shown in FIG. 7A, which is used to record the interference pattern between the reference beam (62) and the $J_o$-profiled beam (54), is set up identical to the apparatus shown in FIG. 5A (and numbered accordingly), and therefore will not be described in detail. Once the interference pattern is recorded in the photosensitive layer of the holographic plate (58), the plate is developed as described herein to provide the diffraction grating for the readout step. The difference in this embodiment is in the readout step shown in FIG. 7B. In this step, a new high power reference beam (102) is directed toward the first side (56) of the developed holographic plate (58) in a direction identical to that of original reference beam (62) The result is a high power $J_o$-profiled beam output (104) from the second side (66) of holographic plate (58). This output beam (104) is not the phase conjugate of the original $J_o$-profiled beam (54); it is colinear therewith.

It will be appreciated that in all embodiments using a holographic plate to record the interference pattern, it is desirable that the reference beam and the $J_o$-profiled beam incident on the holographic plate be relatively equal in intensity. This is accomplished by selecting a beam splitter which splits the laser beam into a high intensity segment of sufficient initial intensity relative to the lower intensity segment that the two segments are approximately equal in intensity after the higher intensity segment passes through the mask containing the annular slit, thereby losing a great deal of its original energy. In order to accomplish this, the reference beam preferably should be approximately 1% of the laser beam's total output.

The computer-generated diffraction gratings, as described hereinabove, can be used in the readout step of all of the above-described processes thereby eliminating the need for the apparatus to produce and record the interference pattern. In general, the use of either a photographic or computer-generated hologram for $J_o$ beam amplification has several advantages over the use of optically non-linear or photorefractive media. Use of a holographic plate may be significantly less expensive than use of optically non-linear media and holographic plates are typically more durable than optically non-linear media such as barium titanate. Furthermore, while the holographic approach requires both development and read-out steps, the read-out configuration is somewhat simpler than that required when using optically non-linear media in dfwm processes. Thus, there are fewer reflecting elements in the set-up and therefore there is an attendant decrease in the loss of power experienced in the system.

It should be understood that the above-described embodiments are merely illustrative of but a small number of the many possible specific embodiments which represent applications of the present invention. We do not wish to be limited to the particular non-linear optical processes and holographic process described herein. Clearly, other phase conjugation processes may be devised which may be adapted for use with the present invention. In addition, numerous and various other arrangements may readily be devised in accordance with these principles by those skilled in the art without departing from the spirit and scope of the invention.

I claim:

1. Apparatus comprising:

a laser for providing coherent light along a first optical path;

optics disposed along the first optical path for splitting said coherent light into a higher intensity segment directed along the first optical path and a lower intensity segment directed along a second optical path;

holographic recording means having a first side, a second side and a photosensitive layer, said plate positioned at an intersection of the first and second optical paths;

optics disposed along the first optical path for expanding the higher intensity segment;

optics disposed along the first optical path for converting the transverse intensity profile of the higher intensity segment into a ring profile;

mask containing an annular slit disposed along the first optical path, the inner radius of said slit being appropriately matched to the inner radius of the ring-profiled segment, said mask for receiving and filtering the ring-profiled segment;

optics disposed along the first optical path for receiving and collimating the filtered ring-profiled segment from said mask, thereby producing a $J_o$-profiled beam, said optics directing the $J_o$-profiled beam toward said first side of said holographic recording means to impinge on said photosensitive layer;

optics disposed along the second optical path for expanding the lower intensity segment, thereby producing a reference beam, said optics also for directing the reference beam toward said first side of said holographic recording means to impinge on said photosensitive layer;

said holographic recording means positioned such that the reference beam and the $J_o$-profiled beam substantially completely overlap at the location whereat they impinge on said photosensitive layer of said holographic recording means, thereby forming an interference pattern which is recorded by said holographic recording means.

2. Apparatus comprising:

a laser for providing coherent light along a first optical path;

optics disposed along the first optical path for splitting said coherent light into a higher intensity segment directed along the first optical path and a lower intensity segment directed along a second optical path;

holographic recording means having a first side, a second side and a photosensitive layer, said plate positioned at an intersection of the first and second optical paths;

optics disposed along the first optical path for expanding the higher intensity segment;

optics disposed along the first optical path for converting the transverse intensity profile of the higher intensity segment into a ring profile;

mask containing an annular slit disposed along the first optical path, the inner radius of said slit being appropriately matched to the inner radius of the ring-profiled segment, said mask for receiving and filtering the ring-profiled segment;

optics disposed along the first optical path for receiving and collimating the filtered ring-profiled segment from said mask, thereby producing a $J_o$-profiled beam, said optics directing the $J_o$-profiled beam toward said first side of said holographic recording means to impinge on said photosensitive layer;

optics disposed along the second optical path for expanding the lower intensity segment, thereby producing a reference beam, said optics also for directing the reference beam toward said second side of said holographic recording means to impinge on said photosensitive layer;

said holographic plate positioned such that the reference beam and the $J_o$-profiled beam substantially completely overlap at the location whereat they impinge on said photosensitive layer of said holographic recording means, thereby forming an interference pattern which is recorded by said holographic recording means.

3. Method of creating a $J_o$-profiled holographic image comprising the steps of:

directing a laser beam of coherent light along a first optical path;

splitting said coherent light into a higher intensity segment directed along the first optical path and a lower intensity segment directed along a second optical path;

expanding the higher intensity segment by means of optics disposed along the first optical path;

converting the transverse intensity profile of the higher intensity segment into a ring profile by means of optics disposed along the first optical path;

filtering the ring-profiled segment by means of a mask containing an annular slit disposed along the first optical path;

collimating the filtered ring-profiled segment by means of optics disposed along the first optical path, thereby producing a first $J_o$-profiled beam, said optics directing the first $J_o$-profiled beam toward a first side of a holographic recording means having a photosensitive layer to impinge on the photosensitive layer;

expanding the lower intensity segment by means of optics disposed along the second optical path, thereby producing a first reference beam, said optics directing the first reference beam toward the first side of the holographic recording means to impinge on the photosensitive layer; and recording in the photosensitive layer of the holographic recording means an interference pattern formed by the substantially complete overlap of the first reference beam and the $J_o$-profiled beam at the location whereat they impinge on the photosensitive layer of the holographic recording means.

4. Method of creating a $J_o$-profiled holographic image comprising the steps of:

directing a laser beam of coherent light along a first optical path;

splitting said coherent light into a higher intensity segment directed along the first optical path and a lower intensity segment directed along a second optical path;

expanding the higher intensity segment by means of optics disposed along the first optical path;

converting the transverse intensity profile of the higher intensity segment into a ring profile by means of optics disposed along the first optical path;

filtering the ring-profiled segment by means of a mask containing an annular slit disposed along the first optical path;

collimating the filtered ring-profiled segment by means of optics disposed along the first optical path, thereby producing a first $J_o$-profiled beam, said optics directing the first $J_o$-profiled beam toward a first side of a holographic recording means having a photosensitive layer to impinge on the photosensitive layer;

expanding the lower intensity segment by means of optics disposed along the second optical path, thereby producing a first reference beam, said optics directing the first reference beam toward a second side of the holographic recording means to impinge on the photosensitive layer; and recording in the photosensitive layer of the holographic recording means an interference pattern formed by the substantially complete overlap of the first reference beam and the $J_o$-profiled beam at the location whereat they impinge on the photosensitive layer of the holographic recording means.

5. Method of generating an amplified $J_o$-profiled beam comprising the steps of:

directing a laser beam of coherent light along a first optical path;

splitting said coherent light into a higher intensity segment directed along the first optical path and a lower intensity segment directed along a second optical path;

expanding the higher intensity segment by means of optics disposed along the first optical path;

converting the transverse intensity profile of the higher intensity segment into a ring profile by means of optics disposed along the first optical path;

filtering the ring-profiled segment by means of a mask containing an annular slit disposed along the first optical path;

collimating the filtered ring-profiled segment by means of optics disposed along the first optical path, thereby producing a first $J_o$-profiled beam, said optics directing the first $J_o$-profiled beam toward a first side of a holographic recording means having a photosensitive layer to impinge on the photosensitive layer;

expanding the lower intensity segment by means of optics disposed along the second optical path, thereby producing a first reference beam, said optics directing the first reference beam toward the first side of the holographic recording means to impinge on the photosensitive layer;

recording in the photosensitive layer of the holographic recording means an interference pattern formed by the substantially complete overlap of the first reference beam and the $J_o$-profiled beam at the location whereat they impinge on the photosensitive layer of the holographic recording means;

developing the photosensitive layer of the holographic recording means thereby producing a hologram diffraction grating having first and second sides; and directing a second reference beam toward the second side of the hologram diffraction grating, the second reference beam counterpropagating with respect to the first reference beam, thereby producing an amplified $J_o$-profiled beam counterpropagating with respect to the first $J_o$-profiled beam.

6. Method of generating an amplified $J_o$-profiled beam comprising the steps of:

directing a laser beam of coherent light along a first optical path;

splitting said coherent light into a higher intensity segment directed along the first optical path and a lower intensity segment directed along a second optical path;

expanding the higher intensity segment by means of optics disposed along the first optical path;

converting the transverse intensity profile of the higher intensity segment into a ring profile by means of optics disposed along the first optical path;

filtering the ring-profiled segment by means of a mask containing an annular slit disposed along the first optical path;

collimating the filtered ring-profiled segment by means of optics disposed along the first optical path, thereby producing a first $J_o$-profiled beam, said optics directing the first $J_o$-profiled beam toward a first side of a holographic recording means having a photosensitive layer to impinge on the photosensitive layer;

expanding the lower intensity segment by means of optics disposed along the second optical path, thereby producing a first reference beam, said optics directing the first reference beam toward a second side of the holographic recording means to impinge on the photosensitive layer;

recording in the photosensitive layer of the holographic recording means an interference pattern formed by the substantially complete overlap of the first reference beam and the $J_o$-profiled beam at the location whereat they impinge on the photosensitive layer of the holographic recording means;

developing the photosensitive layer of the holographic recording means thereby producing a hologram diffraction grating having first and second sides; and directing a second reference beam toward the first side of the hologram diffraction grating, the second reference beam counterpropagating with respect to the first reference beam, thereby producing an amplified $J_o$-profiled beam counterpropagating with respect to the first $J_o$-profiled beam.

7. Method of generating an amplified $J_o$-profiled beam comprising the steps of:

directing a laser beam of coherent light along a first optical path;

splitting said coherent light into a higher intensity segment directed along the first optical path and a lower intensity segment directed along a second optical path;

expanding the higher intensity segment by means of optics disposed along the first optical path;

converting the transverse intensity profile of the higher intensity segment into a ring profile by means of optics disposed along the first optical path;

filtering the ring-profiled segment by means of a mask containing an annular slit disposed along the first optical path;

collimating the filtered ring-profiled segment by means of optics disposed along the first optical path, thereby producing a first $J_o$-profiled beam, said optics directing the first $J_o$-profiled beam toward a first side of a holographic recording means having a photosensitive layer to impinge on the photosensitive layer;

expanding the lower intensity segment by means of optics disposed along the second optical path, thereby producing a first reference beam, said optics directing the first reference beam toward the first side of the holographic recording means to impinge on the photosensitive layer;

recording in the photosensitive layer of the holographic recording means an interference pattern formed by the substantially complete overlap of the first reference beam and the $J_o$-profiled beam at the location whereat they impinge on the photosensitive layer of the holographic recording means;

developing the photosensitive layer of the holographic recording means thereby producing a hologram diffraction grating having first and second sides; and directing a second reference beam toward the first side of the hologram diffraction grating, the second reference beam propagating in the same direction as the first reference beam, thereby producing an amplified $J_o$-profiled beam propagating in the same direction as the first $J_o$-profiled beam.

* * * * *